United States Patent
Hwang et al.

(10) Patent No.: US 8,521,102 B2
(45) Date of Patent: Aug. 27, 2013

(54) TUNNELING CONTROL METHOD AND APPARATUS FOR COORDINATED MULTI-POINT TRANSMISSION, AND METHOD FOR TRANSMITTING DATA

(75) Inventors: Hyo Sun Hwang, Seoul (KR); Ji Hoon Lee, Anyang-si (KR); Jong Bu Lim, Yongin-si (KR); Hyun Ho Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 431 days.

(21) Appl. No.: 12/851,645

(22) Filed: Aug. 6, 2010

(65) Prior Publication Data
US 2011/0086655 A1 Apr. 14, 2011

(30) Foreign Application Priority Data
Oct. 14, 2009 (KR) .................. 10-2009-0097516

(51) Int. Cl.
*H04B 7/02* (2006.01)
*H04B 7/00* (2006.01)
*H04W 72/00* (2009.01)

(52) U.S. Cl.
USPC ......... 455/101; 455/452.1; 455/509; 455/510

(58) Field of Classification Search
USPC .................. 455/450, 451, 452.1, 454, 453
See application file for complete search history.

(56) References Cited

U.S. PATENT DOCUMENTS

| | | | | |
|---|---|---|---|---|
| 5,677,905 A * | 10/1997 | Bigham et al. | ........... | 370/395.21 |
| 5,740,075 A * | 4/1998 | Bigham et al. | ........... | 709/229 |
| 7,542,442 B2 * | 6/2009 | Lee et al. | ........... | 370/328 |
| 8,155,023 B2 * | 4/2012 | Vedantham et al. | ........... | 370/252 |
| 8,208,444 B2 * | 6/2012 | Zou et al. | ........... | 370/331 |
| 2004/0267965 A1 * | 12/2004 | Vasudevan et al. | ........... | 709/250 |
| 2005/0063701 A1 * | 3/2005 | Ovadia et al. | ........... | 398/45 |
| 2008/0117844 A1 | 5/2008 | Thubert et al. | | |
| 2008/0188234 A1 | 8/2008 | Gorokhov et al. | | |
| 2010/0080137 A1 * | 4/2010 | Vedantham et al. | ........... | 370/252 |
| 2011/0086655 A1 * | 4/2011 | Hwang et al. | ........... | 455/507 |

FOREIGN PATENT DOCUMENTS

| | | |
|---|---|---|
| KR | 10-2006-0088072 | 8/2006 |
| KR | 10-2006-0118279 | 11/2006 |
| KR | 10-2008-0037398 | 4/2008 |
| KR | 10-2008-0050183 | 6/2008 |
| KR | 10-2008-0101269 | 11/2008 |

\* cited by examiner

*Primary Examiner* — Tilahun B Gesesse
(74) *Attorney, Agent, or Firm* — NSIP Law

(57) ABSTRACT

A tunneling control method and apparatus for a coordinated multi-point transmission, and a method of transmitting data, are provided. The tunneling control method and the data transmission method may minimize a time delay that occurs because of the coordinated multi-point transmission between base stations.

15 Claims, 8 Drawing Sheets

TUNNELING CONTROL METHOD AND APPARATUS FOR COORDINATED MULTI-POINT TRANSMISSION, AND METHOD FOR TRANSMITTING DATA

CROSS-REFERENCE TO RELATED APPLICATION(S)

This application claims the benefit under 35 U.S.C. §119 (a) of Korean Patent Application No. 10-2009-0097516, filed on Oct. 14, 2009, in the Korean Intellectual Property Office, the entire disclosure of which is incorporated herein by reference for all purposes.

BACKGROUND

1. Field

The following description relates to a tunneling control method and apparatus for a coordinated multi-point transmission between base stations, and a method of transmitting data.

2. Description of Related Art

Coordinated multi-point transmission (CoMP) is a scheme that enables a plurality of base stations to simultaneously transmit signals to terminals located on the edge of a cell. The scheme is used to enhance the data rate at a terminal that has a weak transmission/reception signal. By coordinating and combining signals from multiple antennas (base-stations), CoMP makes it possible for mobile users to enjoy consistent throughput and quality when they access and share videos, photos and other services whether they are near the center of a cell or at the outer edges of the cell.

Study groups such as 3$^{rd}$ Generation Partnership Project Long Term Evolution (3GPP LTE) standard are studying coordinated multi-point transmission. Algorithms to perform coordinated multi-point transmission may include, for example, a coordinated silencing algorithm, a coordinated scheduling/beamforming algorithm, a joint processing/transmission algorithm, and the like.

In a cellular communication system, terminals are mobile. Due to this mobility, the channel status of each of the terminals may vary over time. Also, interference may occur in the terminals due to various causes. Accordingly, to apply the coordinated multi-point transmission in the cellular communication system, information for coordination between the base stations may need to be shared in real-time and may need to be negotiated. When information to be shared is susceptible to a time delay, the time delay may greatly affect the performance of the cellular communication system.

SUMMARY

In one general aspect, there is provided a tunneling control method for data transmission between base stations, the method comprising: reserving an estimated range of resources that are to be used to transmit data for a coordinated multi-point transmission between the base stations; and in response to receiving a request for a data rate that exceeds an average value of the estimated range: controlling a data transmission process using the reserved resources; and utilizing residual resources that are allocated to one or more other data transmission sessions such that the total amount of used resources is within a maximum value of the estimated range.

The tunneling control method may include that the residual resources comprise a size that is between a maximum value and an average value of a second estimated range of resources allocated to the one or more other sessions.

The tunneling control method may further include controlling the data transmission process using the reserved resources to generate a bypass tunnel from an intermediate node of a data transmission path of which a data rate exceeding the maximum value of the estimated range is requested, to an end node, in response to the requested data rate exceeding the maximum value of the estimated range or in response to nodes located on the data transmission path being unable to support the requested data rate.

The tunneling control method may include that the data comprises at least one of coordinated multi-point transmission signaling information, soft handover signaling information, long-term channel feedback information, long-term scheduling information, long-term precoding information, short-term channel feedback information, short-term scheduling information, short-term precoding information, and downlink/uplink data information.

The tunneling control method may further include controlling the one or more other sessions to utilize the residual resources included between the maximum value and the average value of the estimated range among the reserved resources of the estimated range, in response to a requested data rate exceeding the average value of the second estimated range.

In another general aspect, there is provided a method for a coordinated multi-point transmission between base stations, the method comprising: reserving an estimated range of resources that are to be used to transmit data for the coordinated multi-point transmission between the base stations; controlling setup signaling for the coordinated multi-point transmission between the base stations; in response to receiving a request for a data rate that exceeds an average value of the estimated range: controlling a data transmission process using the reserved resources; and utilizing residual resources that are allocated to one or more other data transmission sessions such that the total amount of used resources is within a maximum value of the estimated range; performing the coordinated multi-point transmission between the base stations using the reserved resources and/or the residual resources; controlling release signaling for the coordinated multi-point transmission between the base stations; and releasing the reserved resources.

The method may further include controlling the data transmission process to generate a bypass tunnel from an intermediate node of a data transmission path to an end node, in response to the requested data rate exceeding the maximum value of the estimated range or in response to nodes located on the data transmission path being unable to support the requested data rate.

In another general aspect, there is provided a method for a coordinated multi-point transmission between base stations, the method comprising: establishing a legacy tunnel for the coordinated multi-point transmission between the base stations; reserving an estimated range of resources that are to be used to transmit data; controlling setup signaling for the coordinated multi-point transmission between the base stations; transmitting and receiving first data via the legacy tunnel; in response to receiving a request for a data rate that exceeds an average value of the estimated range, controlling a data transmission process to utilize residual resources allocated to one or more other data transmission sessions such that the total amount of used resources is within a maximum value of the estimated range; transmitting and receiving second data between the base stations using the reserved resources and/or the residual resources; controlling release signaling for the coordinated multi-point transmission between the base stations; releasing the reserved resources; and releasing setup of the legacy tunnel.

The method may further include controlling the data transmission process using the reserved resources to generate a bypass tunnel from an intermediate node of a data transmission path of which a data rate exceeding the maximum value of the estimated range is requested, to an end node, in response to the requested data rate exceeding the maximum value of the estimated range or in response to nodes located on the data transmission path being unable to support the requested data rate.

The method may include that: the first data indicates data comprising a relatively low data rate or being relatively insusceptible to a time delay; and the second data indicates data comprising a relatively high data rate or being relatively susceptible to the time delay.

The method may include that: the first data comprises at least one of: coordinated multi-point transmission signaling information, soft handover signaling information, long-term channel feedback information, long-term scheduling information, and long-term precoding information; and the second data comprises at least one of: short-term channel feedback information, short-term scheduling information, short-term precoding information, and downlink/uplink data information.

In another general aspect, there is provided a tunneling control apparatus for a data transmission between base stations, the apparatus comprising: an event/message handler configured to: receive data and/or a control signal used to share information for a coordinated multi-point transmission between the base stations; and establish a tunnel for transmitting the data or the control signal; and a connection manager comprising a tunnel reservation manager configured to: in response to receiving a request for a data rate that exceeds an average value of the estimated range, reserve an estimated range of resources that are to be used to transmit data for the coordinated multi-point transmission between the base stations; control a data transmission process using the reserved resource; and utilize residual resources allocated to one or more other sessions such that the total amount of used resources is within a maximum value of the estimated range.

The tunneling control apparatus may include that, in response to a requested data rate exceeding a maximum value of the estimated range, or in response to nodes located on the data transmission path being unable to support the requested data rate, the tunnel reservation manager is further configured to control the data transmission process using the reserved resources to generate a bypass tunnel from an intermediate node of a data transmission path of which the data rate is requested, to an end node.

The tunneling control apparatus may include that the data comprises at least one of: coordinated multi-point transmission signaling information, soft handover signaling information, long-term channel feedback information, long-term scheduling information, long-term precoding information, short-term channel feedback information, short-term scheduling information, short-term precoding information, and downlink/uplink data information.

The tunneling control apparatus may include that the tunneling control apparatus is included in any one of a base station, a relay station, and a network controller.

Other features and aspects may be apparent from the following description, the drawings, and the claims.

BRIEF DESCRIPTION OF THE DRAWINGS

Throughout the drawings and the description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems to described herein may be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, description of well-known functions and constructions may be omitted for increased clarity and conciseness.

The term "tunneling" as used herein refers to a scheme of transmitting one or more data packets via a virtual pipe between two nodes on a wireless network. The transmission path between the two nodes is referred to as a tunneling path or a tunnel. Data transmitted via the tunneling path may include a signaling packet that contains a data packet and a signaling message.

A base station may be connected to a dedicated wireless cellular communication network and may provide wireless communication services for terminals. Location information of a terminal connected to the base station may be registered with a mobility management entity (MME). Each base station may transmit data via a serving gateway based on the location information of a terminal. An X2 interface may be used for communication between base stations. An example of using the X2 interface for the communication between the base stations is described herein.

Figure 1:
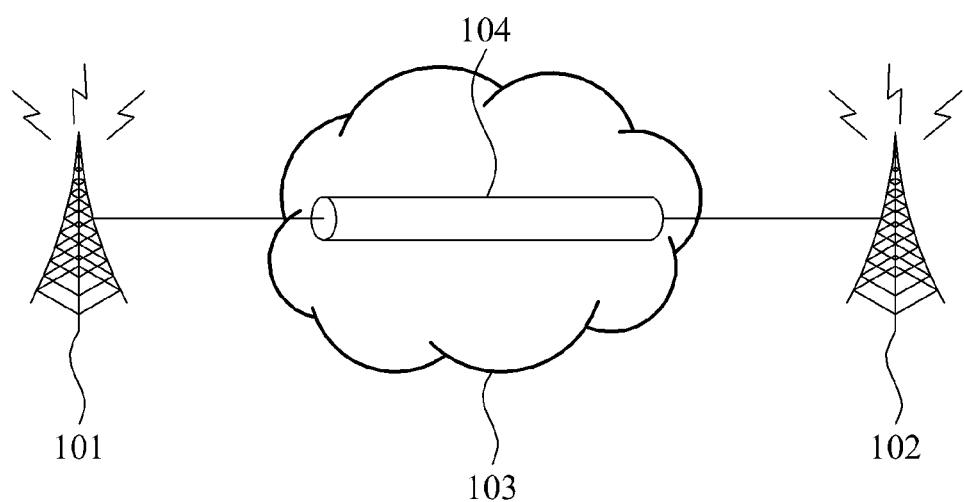
FIG. 1 is a diagram illustrating an example of a wireless network.

FIG. 1 illustrates an example of a wireless network.

Base stations 101 and 102 may share information that may be used for coordinated multi-point transmission. The base stations 101 and 102 may share information via a dedicated wireless cellular communication network 103. The base stations 101 and 102 may establish a tunnel 104 using the dedicated wireless cellular communication network 103, and may transmit and receive shared information via the tunnel 104. After the base stations 101 and 102 transmit/receive the shared information, the base stations 101 and 102 may release the tunnel 104.

In some embodiments, the tunnel 104 may be reserved to share information between the base stations 101 and 102. The shared information may include, for example, at least one of coordinated multi-point transmission signaling information, soft handover signaling information, long-term channel feedback information, long-term scheduling information, long-term precoding information, short-term channel feedback information, short-term scheduling information, short-term precoding information, downlink/uplink data information, and the like.

The example schemes described herein may be applied when the tunnel 104 is reserved.

(1) Resource self-regulation Scheme

Resources may be reserved by inputting an estimated range of transmission resources that are to be used for a coordinated multi-point transmission. For example, the estimated range may include an average value for the amount of transmission resources, a minimum value for the amount of transmission resources, and/or a maximum value for the amount of transmission resources, with respect to an amount of the reserved resources that are going to be used for a coordinated multi-point transmission.

(2) Adaptive Resource Refresh Scheme

When a data rate exceeding the average value of the estimated range of transmission resources is requested, a data transmission process may utilize residual resources that are allocated to one or more other data transmission sessions, such that the total amount of resources is within the maximum value of the estimated range.

(3) Bypass Tunnel Generation Scheme

When a data rate exceeding the maximum value of the estimated range of the transmission resources is requested, the data transmission process may generate a bypass tunnel from an intermediate node of a data transmission path of which the data rate is requested, to an end node.

The aforementioned example schemes are referred to as "adaptive tunnel reservation." Where the adaptive tunnel reservation is applied, shared information between the base stations 101 and 102 may be efficiently transmitted. Accordingly, a routing process may be supported at a high rate using a packet encapsulation and a resource reservation, and the routing process may be performed at a high rate without causing resource collision. The adaptive tunnel reservation is further described with reference to FIGS. 2 and 3.

Figure 2:
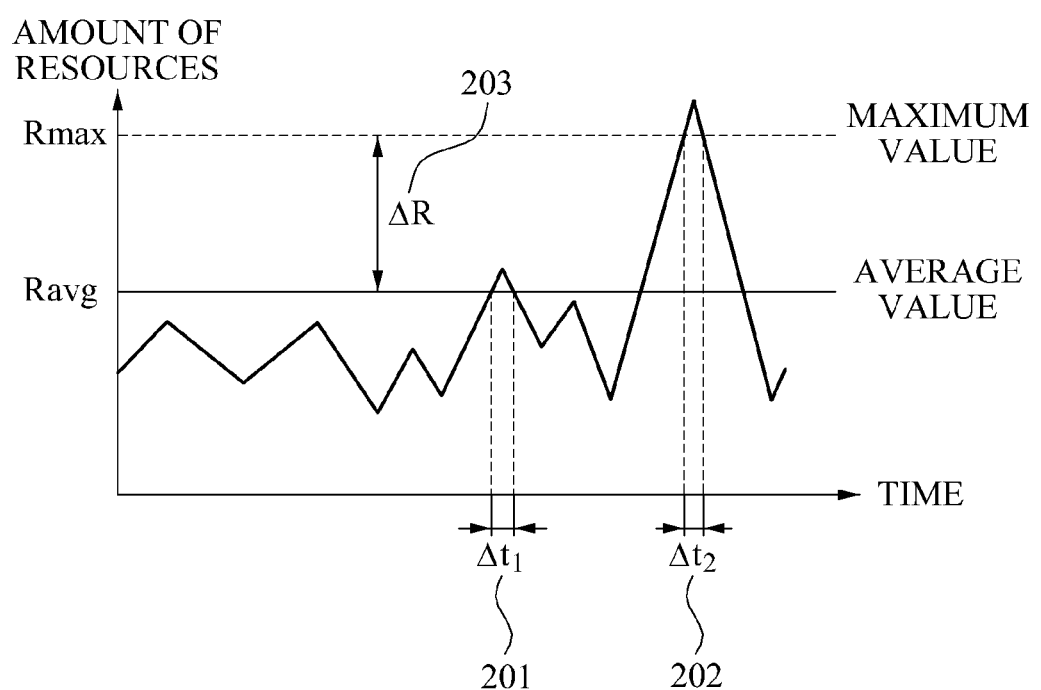
FIG. 2 is a diagram illustrating an example of a change in the amount of transmission resources that are used to transmit data.

FIG. 2 illustrates an example of a change in the amount of transmission resources used to transmit data.

Referring to FIG. 2, illustrated is an estimated range of transmission resources used for a coordinated multi-point transmission between base stations. In this example, the estimated range includes an average value $R_{avg}$ and a maximum value $R_{max}$ with respect to an amount of reserved transmission resources. Generally, an amount of resources less than the average value $R_{avg}$ may be used to transmit data. A scheme for reserving resources by inputting the estimated range may be performed by the aforementioned resource self-regulation scheme.

While transmitting shared information between the base stations, if an amount of resources used in an interval $\Delta t_1$ 201 exceeds the average value $R_{avg}$ of the estimated range, the aforementioned adaptive resource refresh scheme may be performed. If a data rate exceeding the average value $R_{avg}$ of the estimated range of reserved resources is requested, an amount of resources corresponding to a difference $\Delta R$ 203 between the average value $R_{avg}$ and the maximum value $R_{max}$ of the estimated range may be borrowed from residual resources that are allocated to one or more other data transmission sessions. For example, as shown in FIG. 2, an amount of the residual resources corresponding to the difference $\Delta R$ 203 may be utilized.

In an interval $\Delta t_2$ 202, where the data rate exceeding the maximum value $R_{max}$ of the estimated range is requested, or where nodes located on a data transmission path of which a data rate is requested does not support the requested data rate, the aforementioned bypass tunnel generation scheme may be performed. For example, the bypass tunnel may be generated from the intermediate node of the data transmission path, to the end node.

Figure 3:
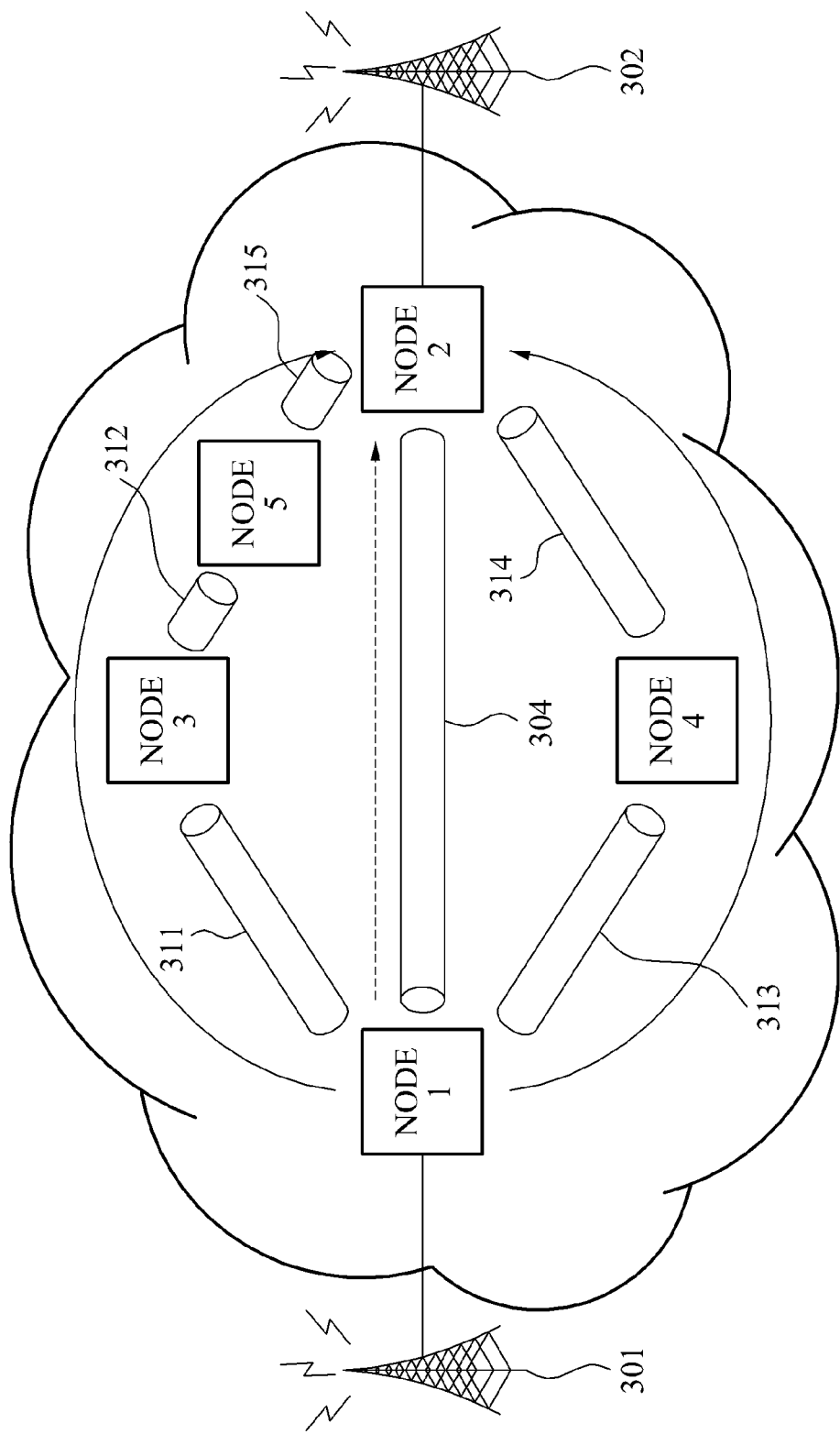
FIG. 3 is a diagram illustrating an example of a bypass tunnel.

FIG. 3 illustrates an example of a bypass tunnel.

Referring to FIG. 3, shared information between base stations 301 and 302 is transmitted via a tunnel 304 that is established between nodes 1 and 2 which are connected to the base stations 301 and 302, respectively. A process of transmitting shared information using the resource self-regulation scheme and the adaptive resource refresh scheme may generate a bypass tunnel from each of intermediate nodes. For example, nodes 1, 2, 3, 4, and 5 of the data transmission path may be used to generate a bypass tunnel, to an end node. Accordingly, when an end node is, for example, a node Z, nodes 1, 2, 3, 4, and 5 of the data transmission path may be used to generate a bypass tunnel, to node Z when a data rate exceeding a maximum value of an estimated range is requested, or where nodes located on a data transmission path do not support the requested data rate.

In this example, the bypass tunnel may include a tunnel 311 between the nodes 1 and the node 3, a tunnel 312 between the node 3 and the node 5, a tunnel 315 between the node 5 and the node 2, a tunnel 313 between the node 1 and the node 4, and a tunnel 314 between the node 4 and the node 2. Accordingly, when a greater data rate is requested while transmitting the shared information, the shared information may be transmitted by generating the bypass tunnel from each of the intermediate nodes to the end node through the bypass tunnel generation scheme.

Figure 4:
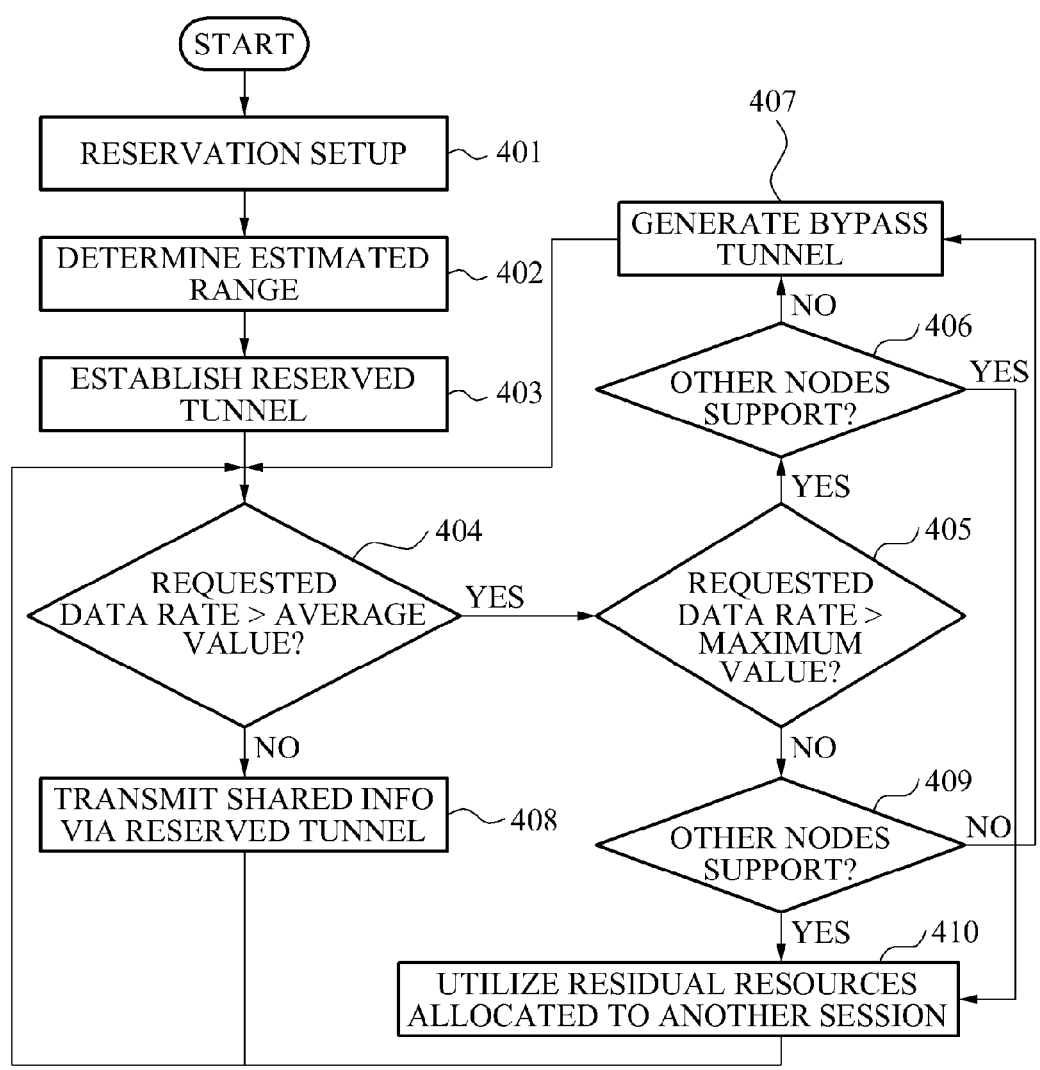
FIG. 4 is a flowchart illustrating an example of a tunneling control method for a coordinated multi-point transmission.

FIG. 4 illustrates an example of a tunneling control method for coordinated multi-point transmission.

In operation 401, a resource reservation setup for the coordinated multi-point transmission is performed. The coordinated multi-point transmission may be between two base stations on a wireless communications network.

In operation 402, tunnel resources are reserved by inputting an estimated range of transmission resources, for example, an estimated amount of resources to be used for the coordinated multi-point transmission. The estimated range may include an average value, a minimum value, and/or a maximum value, with respect to an amount of transmission resources to be used.

In operation 403, a reserved tunnel is established, and shared information between base stations is transmitted.

In operation 404, it is determined whether a requested data rate exceeds an average value of the estimated range of transmission resources. If the data rate exceeding the average value of the estimated range is requested in operation 404, whether the requested data rate exceeds the maximum value of the estimated range is determined in operation 405. If the requested data rate is between the average value of the estimated range and the maximum value of the estimated range, residual resources allocated to one or more other data transmission sessions are utilized in operation 410.

Alternatively, if the requested data rate is less than or equal to the average value of the estimated range in operation 404, the shared information is transmitted via the reserved tunnel in operation 408.

If the requested data rate exceeds the maximum value of the estimated range in operation 405, whether other nodes located on a corresponding data transmission path may support the requested data rate is determined in operation 406. If the other nodes are able to support the requested data rate in operation 406, residual resources allocated to other data transmission sessions are utilized in operation 410. Alternatively, if the other nodes are not able to support the requested data rate in operation 406, a bypass tunnel from an intermediate node of the reserved tunnel to an end node is generated in operation 407.

If the requested data rate is less than or equal to the maximum value of the estimated range in operation 405, whether the other nodes located on the data transmission path are able to support the requested data rate is determined in operation 409. If the other nodes are able to support the requested data rate in operation 409, the residual resources allocated to other sessions are utilized in operation 410. Alternatively, where the other nodes are not able to support the requested data rate in operation 409, the bypass tunnel from the intermediate node of the reserved tunnel to the end node is generated in operation 407.

Figure 5:
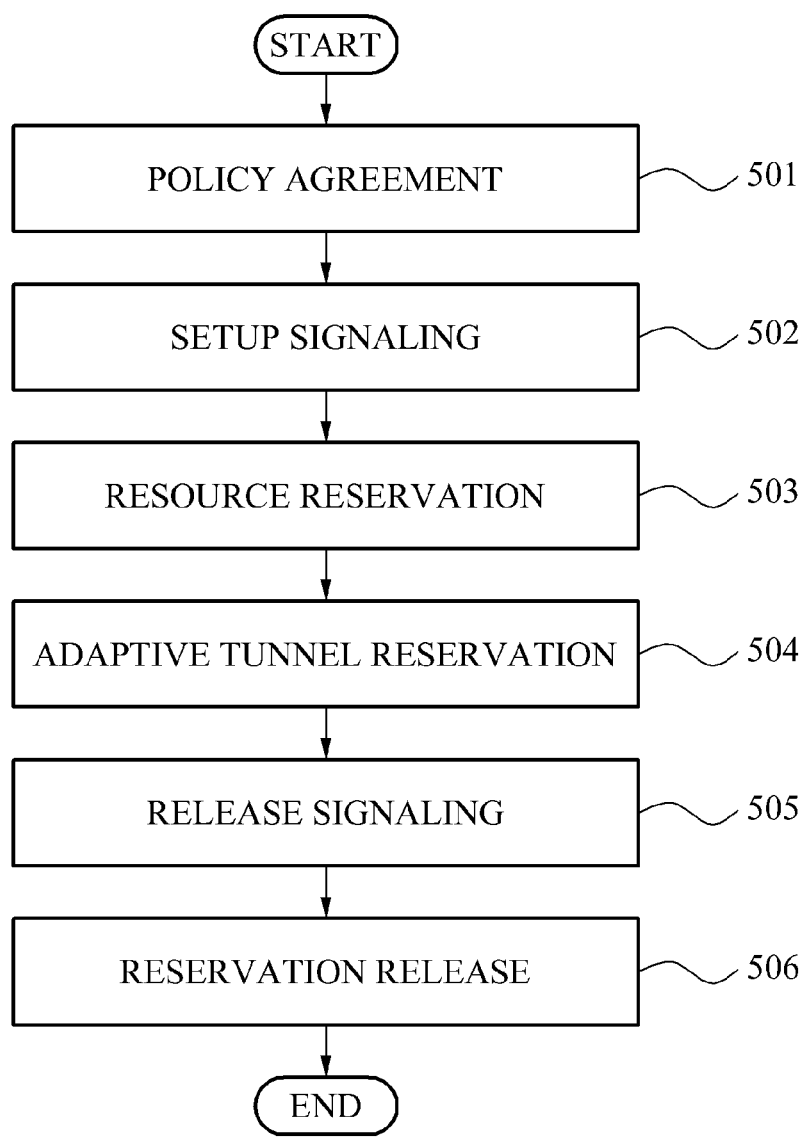
FIG. 5 is a flowchart illustrating an example of a method for coordinated multi-point transmission.

FIG. 5 illustrates an example of a method for coordinated multi-point transmission. The method illustrates a method of transmitting and receiving shared information between the base stations according to an "adaptive tunnel reservation."

In operation 501, a policy for applying the coordinated multi-point transmission between the base stations is formed.

In operation 502, setup signaling for the coordinated multi-point transmission between the base stations is performed.

In operation 503, an estimated range of resources to be used to transmit data for the coordinated multi-point transmission between the base stations are reserved.

In operation 504, an adaptive tunnel reservation is performed. For example, if a data rate exceeding an average value of the estimated range is requested, a transmission process of shared information via a reserved tunnel may utilize residual resources allocated to one or more other data transmission sessions within a maximum value of the estimated range. If the data rate exceeding the maximum value of the estimated range is requested, a data transmission process using the reserved resources may be controlled to generate a bypass tunnel from an intermediate node of a data transmission path to an end node.

In operation 505, release signaling for the coordinated multi-point transmission between the base stations is controlled.

In operation 506, the reserved resources used for the coordinated multi-point transmission between the base stations are released.

Figure 6:
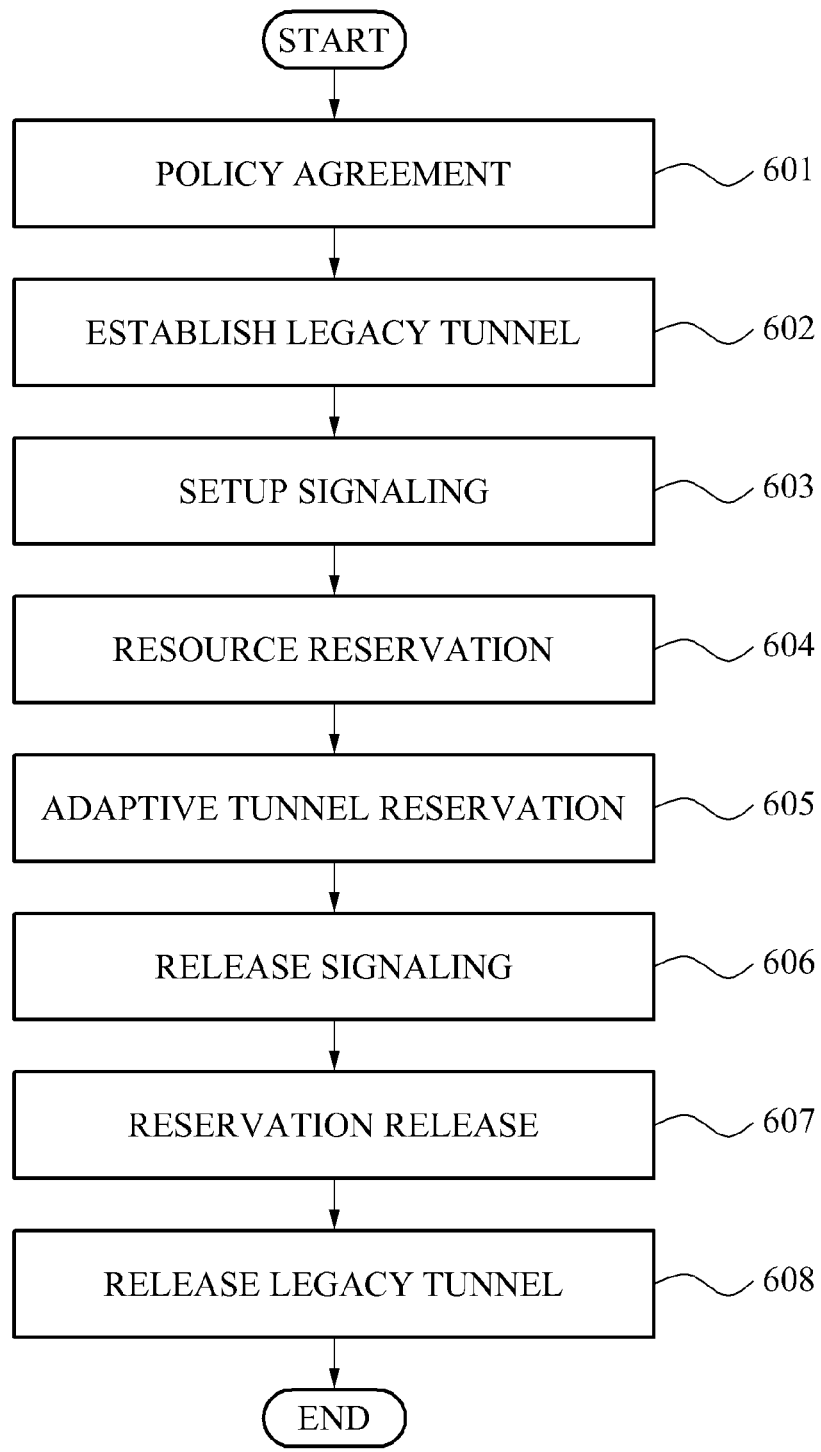
FIG. 6 is a flowchart illustrating another example of a method for coordinated multi-point transmission.

FIG. 6 illustrates another example of a method for coordinated multi-point transmission. The example method described with reference to FIG. 5, illustrates a hybrid method of transmitting and receiving shared information between the base stations using both an "adaptive tunnel reservation" and a legacy tunnel.

According to various embodiments, the adaptive tunnel reservation" or legacy tunnel may be employed based on the information shared between the base stations. For example, the shared information transmitted using the legacy tunnel may include coordinated multi-point transmission signaling information, soft handover signaling information, long-term channel feedback information, long-term scheduling information that is relatively insusceptible to a time delay or has a relatively low data rate, and the like. The shared information transmitted using the adaptive tunnel reservation may include short-term channel feedback information, short-term scheduling information, and/or downlink/uplink data information that is susceptible to the time delay or has a relatively high data rate.

In operation 601, a policy for applying the coordinated multi-point transmission between the base stations is determined and agreed upon by the base stations.

In operation 602, a legacy tunnel is established to transmit shared information for the coordinated multi-point transmission between the base stations. As described above, the shared information transmitted using the legacy tunnel may be relatively insusceptible to the time delay or have the relatively low data rate.

In operation 603, signal setting for the coordinated multi-point transmission between the base stations is performed.

In operation 604, an estimated range of transmission resources to be used to transmit data for the coordinated multi-point transmission between the base stations are reserved.

In operation 605, an adaptive tunnel reservation is performed. For example, where a data rate exceeding an average value of the estimated range is requested, a transmission process may be utilized to share information using residual resources. The residual resources may be those resources allocated to one or more other data transmission sessions, and the amount of residual resources may be within a maximum value of the estimated range. If the data rate exceeding the maximum value of the estimated range is requested, a data transmission process using the reserved resource may generate a bypass tunnel from an intermediate node of a data transmission path of which the data rate is requested, to an end node.

In operation 606, release signaling for the coordinated multi-point transmission between the base stations is controlled.

In operation 607, the reserved resources used for the coordinated multi-point transmission between the base stations are released.

In operation 608, the legacy tunnel established for the coordinated multi-point transmission between the base stations is released.

Figure 7:
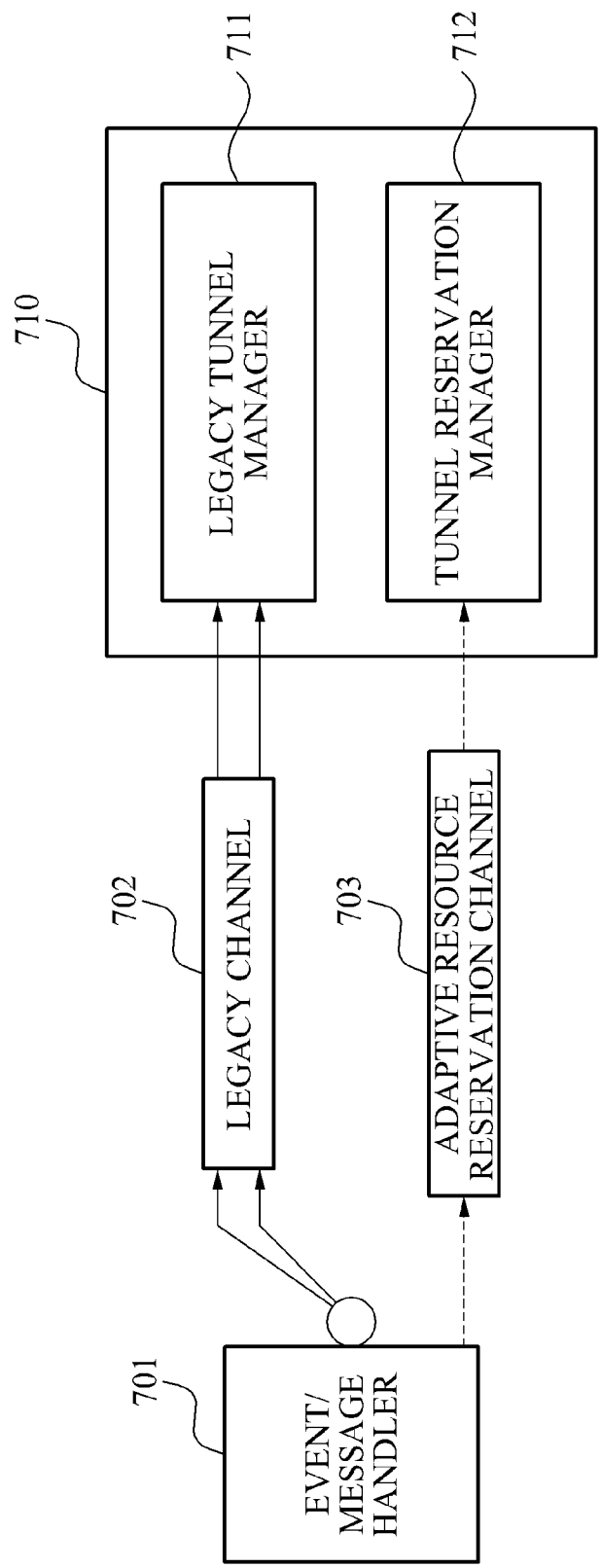
FIG. 7 is a block diagram illustrating an example of a tunneling control apparatus for a coordinated multi-point transmission.

FIG. 7 illustrates an example of a tunneling control apparatus for coordinated multi-point transmission.

The tunneling control apparatus includes an event/message handler 701 and a connection manager 710. The connection manager 710 includes a legacy tunnel manager 711 and a tunnel reservation manager 712.

The event/message handler 701 may receive data and/or a control signal used to transmit and receive shared information for coordinated multi-point transmission between base stations, and may establish a tunnel for transmitting the data and/or the control signal. For example, the event/message handler 701 may determine a suitable channel and connection based on a type and a characteristic of the shared information, to establish the tunnel, and to update and release the tunnel.

The legacy tunnel manager 711 may control the connection using a legacy channel 702 by employing an X2-control plane (C) interface and an X2-user plane (U) interface for a communication between base stations, for example, according to a $3^{rd}$ Generation Partnership Project (3GPP) scheme.

The tunnel reservation manager 712 may reserve an estimated range of transmission resources that are to be used to transmit and receive the shared information via an adaptive resource reservation channel 703 using a newly specified interface. If a data rate exceeding an average value of the estimated range is requested, the tunnel reservation manager 712 may utilize residual resources that are allocated to one or more other sessions, such that the total amount of resources are within a maximum value of the estimated range. If a data rate exceeding the maximum value of the estimated range is requested, or if nodes located on a corresponding data transmission path are not able to support the requested data rate, the tunnel reservation manager 712 may generate and manage a bypass tunnel that is generated from an intermediate node of the data transmission path to an end node.

The tunneling control apparatus of FIG. 7 generates a new interface to transmit the shared information between the base stations using an "adaptive tunnel reservation." The tunneling control apparatus may be included in, for example, a base station, a relay station, a network controller, and the like.

Figure 8:
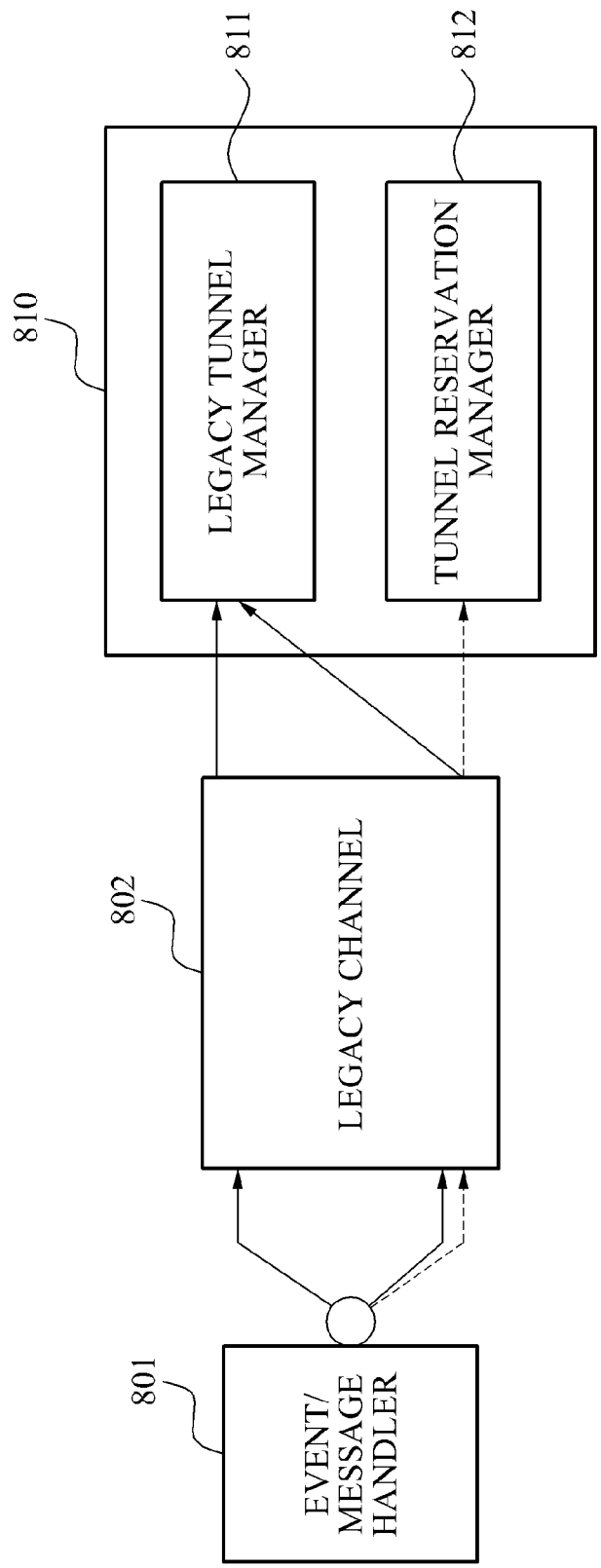
FIG. 8 is a block diagram illustrating another example of a tunneling control apparatus for coordinated multi-point transmission.

FIG. 8 illustrates another example of a tunneling control apparatus for a coordinated multi-point transmission.

The tunneling control apparatus includes an event/message handler 801 and a connection manager 810. The connection manager 810 includes a legacy tunnel manager 811 and a tunnel reservation manager 812.

The event/message handler 801 may receive data and/or a control signal used to transmit and receive shared information for coordinated multi-point transmission between base stations, and may establish a tunnel for transmitting the data and/or the control signal. For example, the event/message handler 801 may determine a suitable channel and connection based on a type and a characteristic of the shared information, to establish the tunnel, and to update and release the tunnel.

The legacy tunnel manager 811 may control the connection using a legacy channel 802 by employing an X2-C interface and an X2-U interface for communication between base stations, for example, according to a 3GPP scheme.

The tunnel reservation manager 812 may reserve an estimated range of transmission resources to be used to transmit and receive the shared information via a legacy channel 802 using the aforementioned X2-C interface and X2-U interface. If a data rate exceeding an average value of the estimated range is requested, the tunnel reservation manager 812 may utilize residual resources that are allocated to one or more other data transmission sessions, such that the residual resources are within a maximum value of the estimated range. If a data rate exceeding the maximum value of the estimated range is requested, or where nodes located on a corresponding data transmission path are not able to support the requested data rate, the tunnel reservation manager 812 may generate and manage a bypass tunnel that is generated from an intermediate node of the data transmission path to an end node.

Accordingly, the tunneling control apparatus of FIG. 8 transmits the shared information between the base stations using an "adaptive tunnel reservation," and the tunneling control apparatus may use an existing interface. In this example, the tunneling control apparatus may employ both a legacy channel and the adaptive tunnel reservation by expanding functions of the existing interface. The tunneling control apparatus may be included in, for example, a base station, a relay station, a network controller, and the like.

The methods described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media such as hard disks, floppy disks, and magnetic tape; optical media such as CD-ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable laptop and/or tablet personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A tunneling control method for data transmission between base stations, the method comprising:
    reserving, by the base stations, an estimated range of resources that are to be used to transmit data for a coordinated multi-point transmission between the base stations; and
    in response to receiving a request for a data rate that exceeds an average value of the estimated range:
        controlling a data transmission process using the reserved resources; and
        utilizing residual resources that are allocated to one or more other data transmission sessions such that the total amount of used resources is within a maximum value of the estimated range.

2. The tunneling control method of claim 1, wherein the residual resources comprise a size that is between a maximum value and an average value of a second estimated range of resources allocated to the one or more other sessions.

3. The tunneling control method of claim 1, further comprising controlling the data transmission process using the reserved resources to generate a bypass tunnel from an intermediate node of a data transmission path of which a data rate exceeding the maximum value of the estimated range is requested, to an end node, in response to the requested data rate exceeding the maximum value of the estimated range or in response to nodes located on the data transmission path being unable to support the requested data rate.

4. The tunneling control method of claim 1, wherein the data comprises at least one of coordinated multi-point transmission signaling information, soft handover signaling information, long-term channel feedback information, long-term scheduling information, long-term precoding information, short-term channel feedback information, short-term scheduling information, short-term precoding information, and downlink/uplink data information.

5. The tunneling control method of claim 2, further comprising controlling the one or more other sessions to utilize the residual resources included between the maximum value and the average value of the estimated range among the reserved resources of the estimated range, in response to a requested data rate exceeding the average value of the second estimated range.

6. A method for a coordinated multi-point transmission between base stations, the method comprising:
   reserving an estimated range of resources that are to be used to transmit data for the coordinated multi-point transmission between the base stations;
   controlling setup signaling for the coordinated multi-point transmission between the base stations;
   in response to receiving a request for a data rate that exceeds an average value of the estimated range:
      controlling a data transmission process using the reserved resources; and
      utilizing residual resources that are allocated to one or more other data transmission sessions such that the total amount of used resources is within a maximum value of the estimated range;
   performing the coordinated multi-point transmission between the base stations using the reserved resources and/or the residual resources;
   controlling release signaling for the coordinated multi-point transmission between the base stations; and
   releasing the reserved resources.

7. The method of claim 6, further comprising controlling the data transmission process to generate a bypass tunnel from an intermediate node of a data transmission path to an end node, in response to the requested data rate exceeding the maximum value of the estimated range or in response to nodes located on the data transmission path being unable to support the requested data rate.

8. A method for a coordinated multi-point transmission between base stations, the method comprising:
   establishing a legacy tunnel for the coordinated multi-point transmission between the base stations;
   reserving an estimated range of resources that are to be used to transmit data;
   controlling setup signaling for the coordinated multi-point transmission between the base stations;
   transmitting and receiving first data via the legacy tunnel;
   in response to receiving a request for a data rate that exceeds an average value of the estimated range, controlling a data transmission process to utilize residual resources allocated to one or more other data transmission sessions such that the total amount of used resources is within a maximum value of the estimated range;
   transmitting and receiving second data between the base stations using the reserved resources and/or the residual resources;
   controlling release signaling for the coordinated multi-point transmission between the base stations;
   releasing the reserved resources; and
   releasing setup of the legacy tunnel.

9. The method of claim 8, further comprising controlling the data transmission process using the reserved resources to generate a bypass tunnel from an intermediate node of a data transmission path of which a data rate exceeding the maximum value of the estimated range is requested, to an end node, in response to the requested data rate exceeding the maximum value of the estimated range or in response to nodes located on the data transmission path being unable to support the requested data rate.

10. The method of claim 8, wherein:
   the first data indicates data comprising a relatively low data rate or being relatively insusceptible to a time delay; and
   the second data indicates data comprising a relatively high data rate or being relatively susceptible to the time delay.

11. The method of claim 10, wherein:
   the first data comprises at least one of coordinated multi-point transmission signaling information, soft handover signaling information, long-term channel feedback information, long-term scheduling information, and long-term precoding information; and
   the second data comprises at least one of short-term channel feedback information, short-term scheduling information, short-term precoding information, and downlink/uplink data information.

12. A tunneling control apparatus for a data transmission between base stations, the apparatus comprising:
   an event/message handler configured to:
      receive data and/or a control signal used to share information for a coordinated multi-point transmission between the base stations; and
      establish a tunnel for transmitting the data or the control signal; and
   a connection manager comprising a tunnel reservation manager configured to:
      in response to receiving a request for a data rate that exceeds an average value of the estimated range, reserve an estimated range of resources that are to be used to transmit data for the coordinated multi-point transmission between the base stations;
      control a data transmission process using the reserved resource; and
      utilize residual resources allocated to one or more other sessions such that the total amount of used resources is within a maximum value of the estimated range.

13. The tunneling control apparatus of claim 12, wherein, in response to a requested data rate exceeding a maximum value of the estimated range, or in response to nodes located on the data transmission path being unable to support the requested data rate, the tunnel reservation manager is further configured to control the data transmission process using the reserved resources to generate a bypass tunnel from an intermediate node of a data transmission path of which the data rate is requested, to an end node.

14. The tunneling control apparatus of claim 12, wherein the data comprises at least one of coordinated multi-point transmission signaling information, soft handover signaling information, long-term channel feedback information, long-term scheduling information, long-term precoding information, short-term channel feedback information, short-term scheduling information, short-term precoding information, and downlink/uplink data information.

15. The tunneling control apparatus of claim 12, wherein the tunneling control apparatus is included in any one of a base station, a relay station, and a network controller.

* * * * *